(12) United States Patent
Ijzerman

(10) Patent No.: US 8,421,723 B2
(45) Date of Patent: Apr. 16, 2013

(54) STEREOSCOPIC DISPLAY APPARATUS

(75) Inventor: Willem L. Ijzerman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1263 days.

(21) Appl. No.: 11/720,528

(22) PCT Filed: Dec. 5, 2005

(86) PCT No.: PCT/IB2005/054043
§ 371 (c)(1),
(2), (4) Date: May 31, 2007

(87) PCT Pub. No.: WO2006/061761
PCT Pub. Date: Jun. 15, 2006

(65) Prior Publication Data
US 2009/0128474 A1    May 21, 2009

(30) Foreign Application Priority Data

Dec. 6, 2004   (EP) ...................................... 04106332

(51) Int. Cl.
*G09G 3/36* (2006.01)
(52) U.S. Cl.
USPC ............... 345/87; 345/204; 345/208; 345/94; 359/462; 359/463
(58) Field of Classification Search .................... 345/94, 345/204, 208, 55, 87, 95; 359/362, 237, 359/238, 245, 246, 251, 252, 364, 366, 376, 359/462–466; 348/42, 51, 54–59
See application file for complete search history.

(56) References Cited

U.S. PATENT DOCUMENTS

| | | | |
|---|---|---|---|
| 3,991,416 A | | 11/1976 | Byles et al. |
| 5,189,547 A | * | 2/1993 | Day et al. ...................... 359/245 |
| 5,347,382 A | * | 9/1994 | Rumbaugh ...................... 349/18 |
| 5,426,526 A | | 6/1995 | Yamamoto et al. |
| 5,495,265 A | | 2/1996 | Hartman et al. |
| 6,064,424 A | | 5/2000 | van Berkel et al. |
| 6,069,650 A | | 5/2000 | Battersby |
| 6,268,840 B1 | * | 7/2001 | Huang ............................. 345/94 |
| 6,304,239 B1 | * | 10/2001 | McKnight ....................... 345/87 |
| 7,027,023 B2 | | 4/2006 | Okishiro et al. |
| 2002/0047837 A1 | * | 4/2002 | Suyama et al. ............... 345/204 |
| 2003/0058264 A1 | | 3/2003 | Takako et al. |
| 2008/0246897 A1 | * | 10/2008 | Gaudreau ....................... 349/15 |

FOREIGN PATENT DOCUMENTS

| | | |
|---|---|---|
| JP | 10048597 A | 2/1998 |
| JP | 2003091014 A | 3/2003 |
| WO | WO8706018 A1 | 10/1987 |
| WO | WO9530172 A1 | 11/1995 |

OTHER PUBLICATIONS

Sneh et al: "High-Speed Analog Refractive-Index Modulator That Uses a Chiral Smectic Liquid Crystal"; Optics Letter, Feb. 15, 1994, vol. 19, No. 4, pp. 305-307, XP000429263.

Ye, M., et al.; Increasing of the Operating Speed of a Liquid Crystal Lens by a New Method of Voltage Application; 1994; Optics Letters; 19(4)305-307.

* cited by examiner

*Primary Examiner* — Jason Mandeville

(57) ABSTRACT

In a stereoscopic display apparatus having optical directory elements (21) such as lenticular elements an overdrive voltage, e.g. obtained by introducing a resonant impedance (22) in one of the switching states, enhances switching speed between the 2D and the 3D state.

13 Claims, 2 Drawing Sheets

STEREOSCOPIC DISPLAY APPARATUS

The present application relates to a stereoscopic display apparatus comprising means for producing a display having picture elements in a first plane and optical directory means comprising at least one optical directory liquid crystal element, the optical directory liquid crystal means overlying the picture elements in the first plane for directing the outputs of the picture elements in mutually different angular directions, the optical liquid crystal directory means being switchable between two different states by means of driving means.

Such stereoscopic display apparatuses are increasingly used both in hand held applications like telephones and in (TV) monitors, where a multiple view is used.

A stereoscopic display apparatus of the kind mentioned above is described in U.S. Pat. No. 6,064,424, which shows an active matrix liquid crystal display panel having picture elements arranged in groups of picture elements and a lenticular screen having (cylindrical) lenticular elements, or lenticulars, overlying the display panel.

Each of the lenticular elements, which are based on a liquid crystal device, covers several picture elements. In one state, e.g. in the case no voltage is applied across the material, for one polarization direction a difference in index of refraction exists between the liquid crystal material and the material of the lenticular (lens structure).

Consequently the light of each picture element is sent into different well-defined directions depending. In this way in a typical example nine independent views are created corresponding to nine different viewing angles. A viewer receives different views in each eye and, when using the proper image content, observes a three-dimensional image.

If a voltage is applied across the liquid crystal material of the lenticular element, the liquid crystal molecules orient themselves differently and there is no difference in index of refraction. Consequently, there is no lens effect.

So, by changing the voltage, switching between a two-dimensional view (2D-mode) and a three-dimensional view (3D mode) is possible.

It appears however that, in practice, the switching speed e.g. from the 3D mode to the 2D mode is too low for practical purposes.

The present application has as one of its purposes to overcome this problem. To this end a device according to the invention has driving means, which in at least one switching direction driving provide the optical liquid crystal directory means with an overdrive voltage before applying to the optical liquid crystal directory means a stationary hold voltage.

The invention is based on the insight that increasing the voltage does in fact lead to an increased switching speed, but also increase power consumption. The increased power consumption can be overcome by switching back to a lower hold-voltage. In fact the non-linearity of the capacity of the switchable liquid crystal material is used to obtain faster switching behavior (so-called "capacitive overdrive").

In this respect it should be noted that this "capacitive overdrive" is known per se from U.S. Pat. No. 5,495,265. In this application switching back to a kind of hold-voltage is not possible however, since this is a display application in which, while preparing the next overdrive pulse it is assumed that the former drive voltage still is present on the capacitance representing the pixel. So this "switching back to a kind of hold-voltage" only is possible in devices using two bistable states.

These and other aspects of the present application are apparent from and will be elucidated with reference to the embodiments described hereinafter.

In the drawings:

FIG. 1 schematically shows a part of a device according to the invention,

FIG. 2 shows a plan view of the part of the device of FIG. 1, while

The Figures are diagrammatic and not to scale; corresponding components are generally denoted by the same reference numerals.

Figure 1:
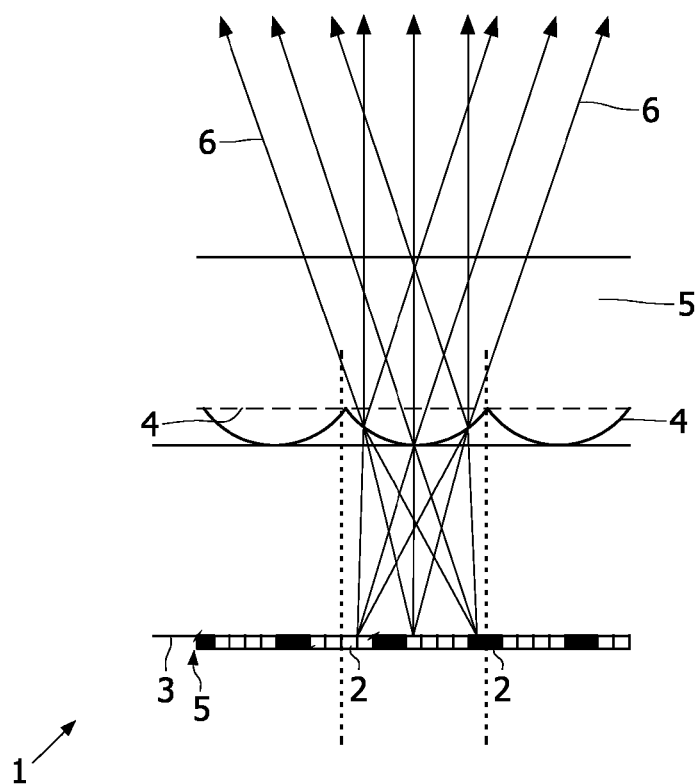

FIG. 1 shows a schematic diagram of a part of a device 1 according to the present application having a display device 5 with laterally separated picture elements 2 in a first plane 3. The device 1 has optical directory means, in this example a group of lenses (lenticulars) 4, each of which is associated with a group of picture elements 2. The lenses 4 cover the picture elements 2 in the first plane 3 for directing the outputs of the picture elements in mutually different angular directions, the first plane lying substantially out of the main focus plane of the lenses 4. In this example the lenses are provided on a separate plate 5 in front of the display, with the curved side facing the display. The angular directions are indicated by means of arrows 6.

Figure 2:
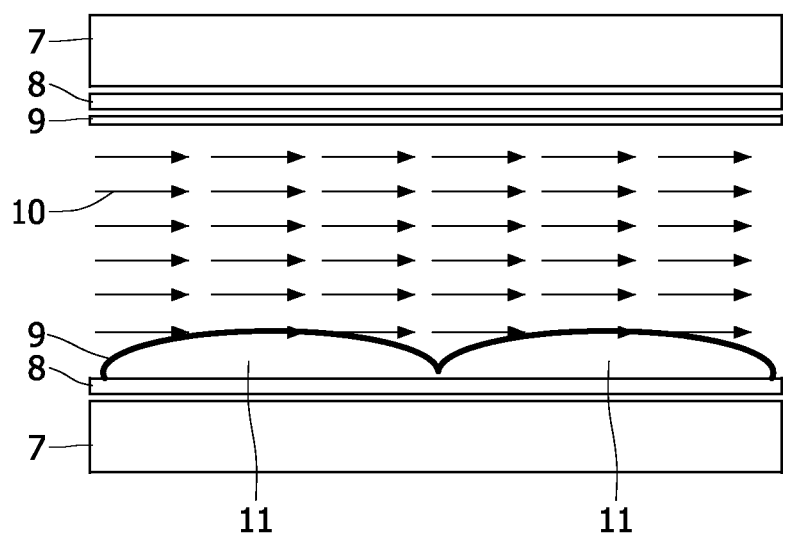

A possible realization of such a lens 4 is shown in FIG. 2. A layer of liquid crystal material 10 is provided between two glass substrates 7. The glass substrates 7 comprise electrodes 8. On one glass plate a lens structure has been made for instance by means of replication technique. On this lens structure and also on the opposite glass substrate an orientation layer has been provided to orient the liquid crystal molecules of the liquid crystal material 10. In case there is no potential difference applied across the liquid crystal material of the lens 4 via the electrodes 8, there is (for one polarization direction) a difference in the index of refraction between the liquid crystal material and the material of the lens structure.

The result is that the structure acts as a lens, or a lens array in case more lenses 4 are provided (a lenticular screen). If a voltage is applied across the liquid crystal material, the liquid crystal molecules orient themselves differently and there is no difference in the index of refraction. Consequently, there is no lens effect. So, by introducing the possibility of changing the voltage, a lens is obtained, which is switchable between a two-dimensional view (2D-mode) and a three-dimensional view (3D mode).

To avoid charging of the liquid crystal material AC driving of the switchable lenses is preferred. In a typical application it is sufficient to have an AC voltage of 10 Volt at a frequency of 1 kHz to obtain switching between the two-dimensional view (2D-mode) and a three-dimensional view (3D mode). However, at 10 Volt the initial switching from a 3D mode to a 2D mode is performed relatively slowly. Increasing the voltage goes with an increased switching speed, but at the same time with an increased power consumption. In particular in mobile applications this power consumption is a severe drawback.

According to the present application this higher voltage is only applied for a short instance and afterwards the AC voltage is reduced. In fact the non-linearity of the capacity of the switchable lenses 4 is used to obtain such a switching behavior.

Figure 3:
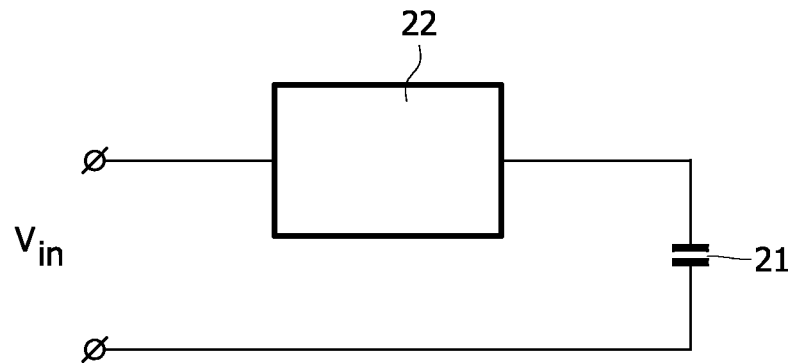
FIG. 3 shows a diagrammatical representation of the device of FIG. 1.

An electrical circuit that performs this behavior is shown in FIG. 3. The impedance Z of circuit component 22 can be tuned such that for the capacitance C, corresponding to the 3D mode of the lens circuit 21, the circuit is close to its resonant frequency. The ratio between the applied voltage $V_{in}$ and the voltage across the cell $V_{cell}$ is given by:

$$\frac{\|V_{cell}\|}{|V_{in}|} = \left|\frac{1}{1+j\omega C}\right|,$$

in which ω is the driving frequency.

Figure 4:
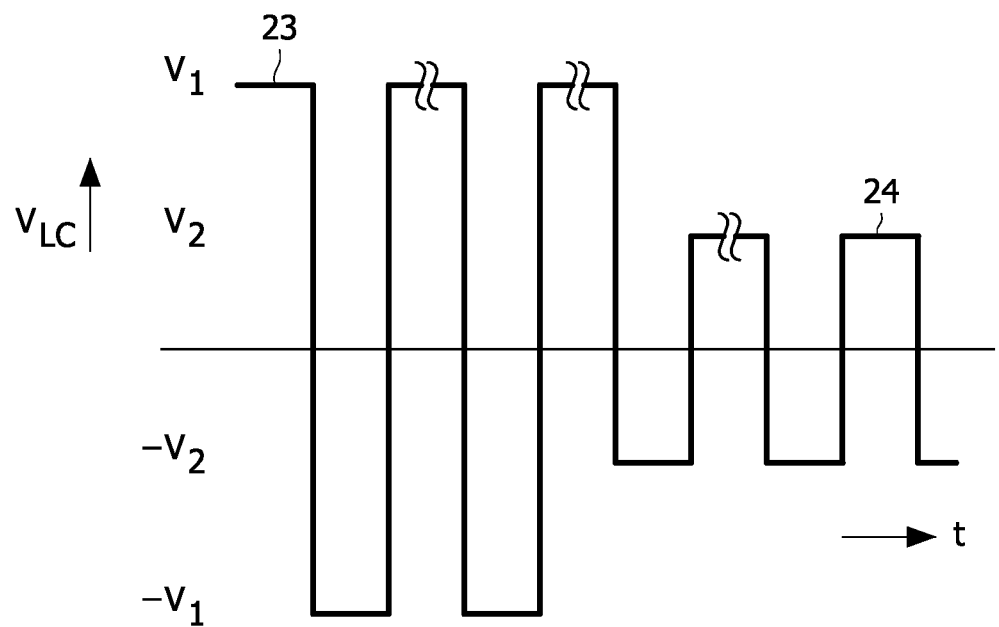
FIG. 4 show an example of a driving pattern.

Now, if the impedance Z equals 1/(ωC), a the voltage $V_{cell}$ across the cell is large (e.g. an AC voltage $V_1$ with $V_1$=30 V (or higher), see FIG. 4). Due to the large voltage, the 3D mode changes into the 2D mode rapidly and the capacity of the lens circuit changes. When the capacitance changes, the FIG. 3 circuit is no longer driven close to its resonant frequency and consequently the voltage swing across the lens cell is more moderate (e.g. an AC voltage $V_2$ with $V_2$=10 V, see FIG. 4).

The switching speed from the 2D to 3D mode is not determined by the applied voltage but by the mechanical tension in the molecules. This tension is, among others, determined by cell gap and twist angle. In switching from the 3D mode to the 2D mode the cell may be short-circuited to allow the cell to discharge.

The present application is not restricted to the examples shown. For instance other constructions of the lenses 4 are possible. By changing the liquid crystal material it is possible to have a lens in which for the 3D mode a voltage needs to be applied, while for the 2D mode the cell is short-circuited. Also at lower voltages of $V_1$ (e.g. 20 V) the 3D mode changes into the 2D mode rapidly.

Instead of liquid crystal display picture elements, electrophoretic picture elements, electro-wetting picture elements may be used alternatively.

The invention resides in each and every novel characteristic feature and each and every combination of features. Reference numerals in the claims do not limit the protective scope of these claims. The use of the verb "to comprise" and its conjugations does not exclude the presence of elements other than those stated in the claims. The use of the article "a" or "an" preceding an element does not exclude the presence of a plurality of such elements.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. A stereoscopic display apparatus comprising:
    display having picture elements in a first plane;
    an optical liquid crystal including at least one optical liquid crystal element, the optical liquid crystal overlying the picture elements in the first plane and directing the outputs of the picture elements in mutually different angular directions, the optical liquid crystal being switchable between two-dimensional state and a three-dimensional state; and
    a driving circuit which utilizes a capacitive overdrive to apply an A.C. driving voltage to the optical liquid crystal such that the driving circuit:
        applies an overdrive A.C. voltage to the optical liquid crystal to accelerate switching the optical liquid crystal from the three-dimensional state to the two-dimensional state, the overdrive A.C. voltage being applied by driving the optical liquid crystal at a drive frequency equal to a resonant frequency of the optical liquid crystal in the three-dimensional state, and
        applies a stationary hold A.C. voltage to the optical liquid crystal to maintain the optical liquid crystal in the two-dimensional state, and absolute value of the overdrive A.C. voltage being at least twice the absolute value of the stationary hold A.C. voltage, the stationary hold A.C. voltage applied at the drive frequency, wherein a switching between the overdrive A.C. voltage and the stationary hold A.C. voltage occurs due to a change in the resonant frequency of the optical liquid crystal as a result of a non-linearity of a capacitance of the optical liquid crystal between the three-dimensional state and the two-dimensional state, and
        removes the stationary hold A.C. voltage and the overdrive A.C. voltage applied to the optical liquid crystal to switch the liquid crystal from the two-dimensional state to the three-dimensional state.

2. The stereoscopic display apparatus according to claim 1 the absolute value of the overdrive A.C. voltage being at least 20 volts.

3. The stereoscopic display apparatus according to claim 1, wherein the picture elements in the first plane comprising picture elements from the group of: liquid crystal display picture elements, electrophoretic picture elements, electrowetting picture elements.

4. The stereoscopic display apparatus according to claim 1, wherein each of the optical liquid crystal elements includes a layer of liquid crystal material between two glass substrates, the glass substrates including electrodes for applying voltage across the liquid crystal material.

5. A stereoscopic display apparatus comprising:
    an array of picture elements disposed in a first plane;
    a lenticular lens array including lens structures having a first index of refraction and having a main focus plane different from the first plane and a layer of liquid crystal material contacting the lens structures, the liquid crystal material having the first index of refraction when polarized in a first direction and a second index of refraction when polarized in a second direction such that when the liquid crystal material is polarized in one of the first and second direction, the lens structures and the liquid crystal material have the same index of refraction and outputs of the pictures elements pass through the lenticular lens array unaltered and such that when the liquid crystal material is polarized in the other of the first and second directions the lens structures and the liquid crystals material have different indices of refraction and the outputs of the picture elements are directed in mutually different directions, such that the lens structures and the liquid crystal material can be switched between a two-dimensional state and three-dimensional state and three-dimensional state; and
    a drive circuit which applies an overdrive A.C. voltage to the liquid crystal material to switch the polarization from the first direction corresponding to the three-dimensional state to the second direction corresponding to the two-dimensional state followed by a stationary hold A.C. voltage applied to the liquid crystal material to hold the liquid crystal material polarized in the second direction wherein the overdrive A.C. voltage is applied by driving the liquid crystal material at a drive frequency equal to a resonant frequency of the liquid crystal material in the three-dimensional state, and the stationary hold A.C. voltage is applies at the drive frequency, wherein a switching between the overdrive A.C. voltage and the stationary hold A.C. voltage occurs due to a change in the resonant frequency of the liquid crystal material as a result of a non-linearity of a capacitance of the liquid crystal material between the three-dimensional state and the two-dimensional state, the overdrive A.C. voltage being at least twice the stationary hold A.C. voltage.

6. The stereoscopic display apparatus according to claim 5, wherein the overdrive A.C. voltage is at least 20 volts.

7. A method for driving a stereoscopic display comprising:
covering a plurality of picture elements of a display with a plurality of lenses that include a liquid crystal, the picture elements and the liquid crystals being in parallel planes and the lenses being switchable between first and second indices of refraction to switch the lenses between a two-dimensional state and a three-dimensional state in which outputs of the pictures elements are directed in mutually different angular directions by the plurality of lenses;
applying an A.C. overdrive voltage at a drive frequency equal to a resonant frequency of the liquid crystal in a first of the two dimensional state and the three dimensional state, to accelerate switching the lenses from the first of the two-dimensional state and the three-dimensional state to the second of the two-dimensional state and three-dimensional state,
applying a stationary hold A.C. voltage at the drive frequency following the overdrive voltage to hold the lenses in the second of the two-dimensional state and the three-dimensional state, an absolute value of the of the overdrive A.C. voltage being at least twice the absolute value of the stationary hold A.C. voltage and a switching between the overdrive A.C. voltage and the stationary hold A.C. voltage occurs due to a change in the resonant frequency of the liquid crystal as a result of a non-linearity of a capacitance of the liquid crystal between the two-dimensional state and the three-dimensional state.

8. The method according to claim 7, wherein the overdrive A.C. voltage is at least 20 volts.

9. The method according to claim 7, wherein applying the overdrive A.C. voltage switches the plurality of lenses into the two-dimensional state, and applying the stationary hold A.C. voltage holds the plurality of lenses in the two-dimensional state.

10. The stereoscopic display apparatus according to claim 5, wherein the drive circuit removes the stationary hold A.C. voltage to switch the polarization from the second direction to the first direction.

11. The method according to claim 9, further including:
discharging the stationary hold A.C. voltage from the plurality of lenses to switch the plurality of lenses from the two-dimensional state to the three-dimensional state.

12. The method according to claim 7, further including:
discharging the stationary hold A.C. voltage from the plurality of lenses to switch the plurality of lenses from the one of the two and three-dimensional states to the other of the two and three-dimensional states.

13. A stereoscopic display having a two-dimensional display mode and a three-dimensional display mode, the apparatus comprising:
an array of picture elements in a plane;
an array of lens structures with curved faces which direct outputs from the array of the picture elements in different directions, the lens structures having a first index of refraction;
the lens structures comprising optical liquid crystal elements, the optical liquid crystal elements being switchable between the first index of refraction and a second index of refraction by an A.C. drive voltage, the second index of refraction being different from the first index of refraction, the optical liquid crystal elements having a non-linearity of a capacitance of the optical liquid crystal elements resulting in a first capacitance at the first index of refraction and a second capacitance at the second index of refraction, the second capacitance being different from the first capacitance;
a drive circuit configured to:
apply an A.C. drive voltage at a resonance frequency when the optical liquid crystal elements are in the first index of refraction to switch the optical liquid crystal elements from the first index of refraction to the second index of refraction,
continue to apply the drive A.C. voltage at a reduced magnitude at the resonance frequency of the optical liquid crystal elements in the first index of refraction to the array of the optical liquid crystal elements in the second index of refraction to hold the optical liquid crystal elements at the second index of refraction, the reduced magnitude of the drive A.C. voltage resulting from the non-linearity of the capacitance of the liquid crystal, and
discharge the drive voltage to switch the optical liquid crystal elements from the second index of refraction to the first index of refraction.

* * * * *